United States Patent
Nagata et al.

(10) Patent No.: US 9,310,798 B2
(45) Date of Patent: Apr. 12, 2016

(54) MOTOR DRIVE DEVICE

(75) Inventors: Yuichi Nagata, Chiyoda-ku (JP); Shuya Sano, Chiyoda-ku (JP); Hiroshi Sugie, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 6 days.

(21) Appl. No.: 14/385,558

(22) PCT Filed: Mar. 30, 2012

(86) PCT No.: PCT/JP2012/058623
§ 371 (c)(1),
(2), (4) Date: Sep. 16, 2014

(87) PCT Pub. No.: WO2013/145267
PCT Pub. Date: Oct. 3, 2013

(65) Prior Publication Data
US 2015/0048772 A1    Feb. 19, 2015

(51) Int. Cl.
G05B 19/404    (2006.01)
H02P 29/00     (2006.01)
G05B 6/02      (2006.01)
H02K 11/00     (2006.01)

(52) U.S. Cl.
CPC .......... G05B 19/404 (2013.01); G05B 6/02 (2013.01); H02K 11/0047 (2013.01); H02P 29/0055 (2013.01); H02K 11/0015 (2013.01)

(58) Field of Classification Search
CPC .................................................. G05B 19/404
USPC ......................................... 318/634, 632, 560
See application file for complete search history.

(56) References Cited

U.S. PATENT DOCUMENTS 4,712,050 A * 12/1987 Nagasawa ............... H02P 6/182
                                                318/400.04
7,615,951 B2    11/2009 Son et al.
(Continued)

FOREIGN PATENT DOCUMENTS

JP       07-143662 A      6/1995
JP    2002-324392 A      11/2002
(Continued)

OTHER PUBLICATIONS

International Search Report for PCT/JP2012/058623 dated Jun. 5, 2012.
(Continued)

*Primary Examiner* — David S Luo
(74) *Attorney, Agent, or Firm* — Sughrue Mion, PLLC

(57) ABSTRACT

A motor drive device in embodiments includes: a motor drive unit that generates a current for driving a motor on a basis of a position command and a position detection value of the motor; a motor-coil ambient-temperature estimation unit that calculates a motor-coil ambient-temperature estimation value by correcting an output value of a temperature sensor provided in a peripheral portion of a motor coil of the motor by using a filter including both a phase-lead characteristic and a low-pass characteristic; a motor-coil increased-temperature estimation unit that calculates a motor-coil increased-temperature estimation value on a basis of the current; and a motor-coil protection unit that limits the current on a basis of the motor-coil ambient-temperature estimation value and the motor-coil increased-temperature estimation value.

4 Claims, 8 Drawing Sheets

(56) References Cited

U.S. PATENT DOCUMENTS

| | | | |
|---|---|---|---|
| 2002/0159354 A1 | 10/2002 | Nakabayashi | |
| 2009/0066283 A1 | 3/2009 | Son et al. | |

FOREIGN PATENT DOCUMENTS

| | | | |
|---|---|---|---|
| JP | 2004-268671 A | 9/2004 |
| JP | 2005-204358 A | 7/2005 |
| JP | 2005-295738 A | 10/2005 |
| JP | 2007-010436 A | 1/2007 |
| JP | 2008-141941 A | 6/2008 |

OTHER PUBLICATIONS

Written Opinion of PCT/JP2012/058623 dated Jun. 5, 2012.
Examination Report for the Intellectual Property Office for Taiwanese Application 101136313 dated Apr. 3, 2014.
Communication dated Jan. 20, 2016, from the Korean Intellectual Property Office in corresponding Korean Application No. 10-2014-7029494.

* cited by examiner

MOTOR CURRENT i

ESTIMATED AMOUNT OF HEAT GENERATION IN MOTOR COIL $R \cdot P = R \cdot i^2$

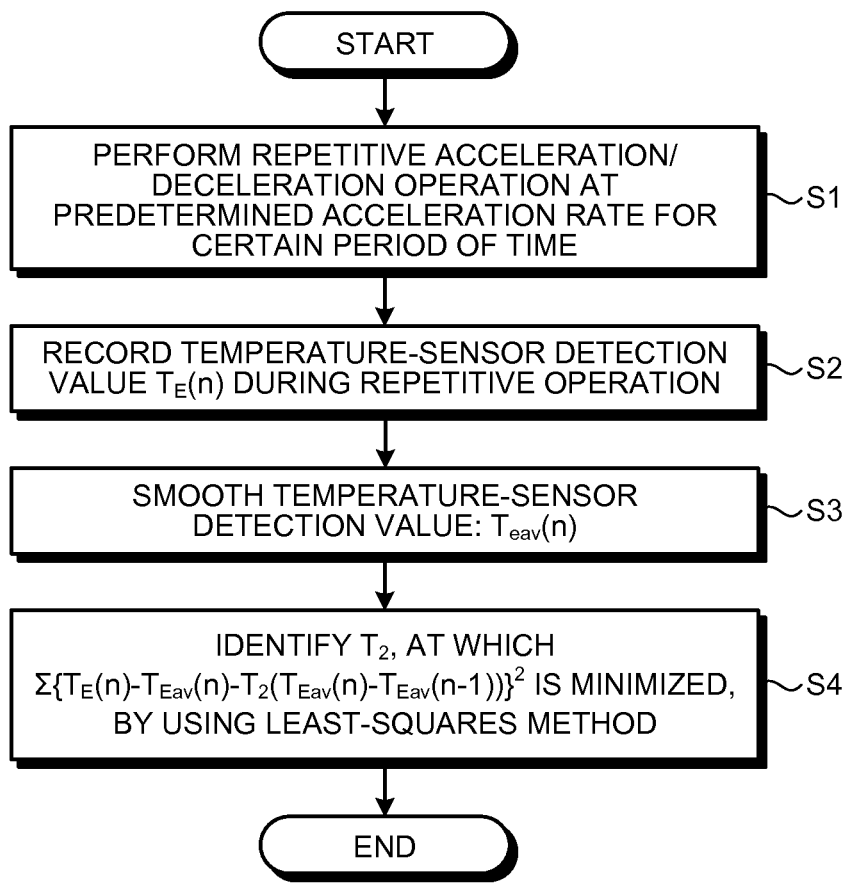

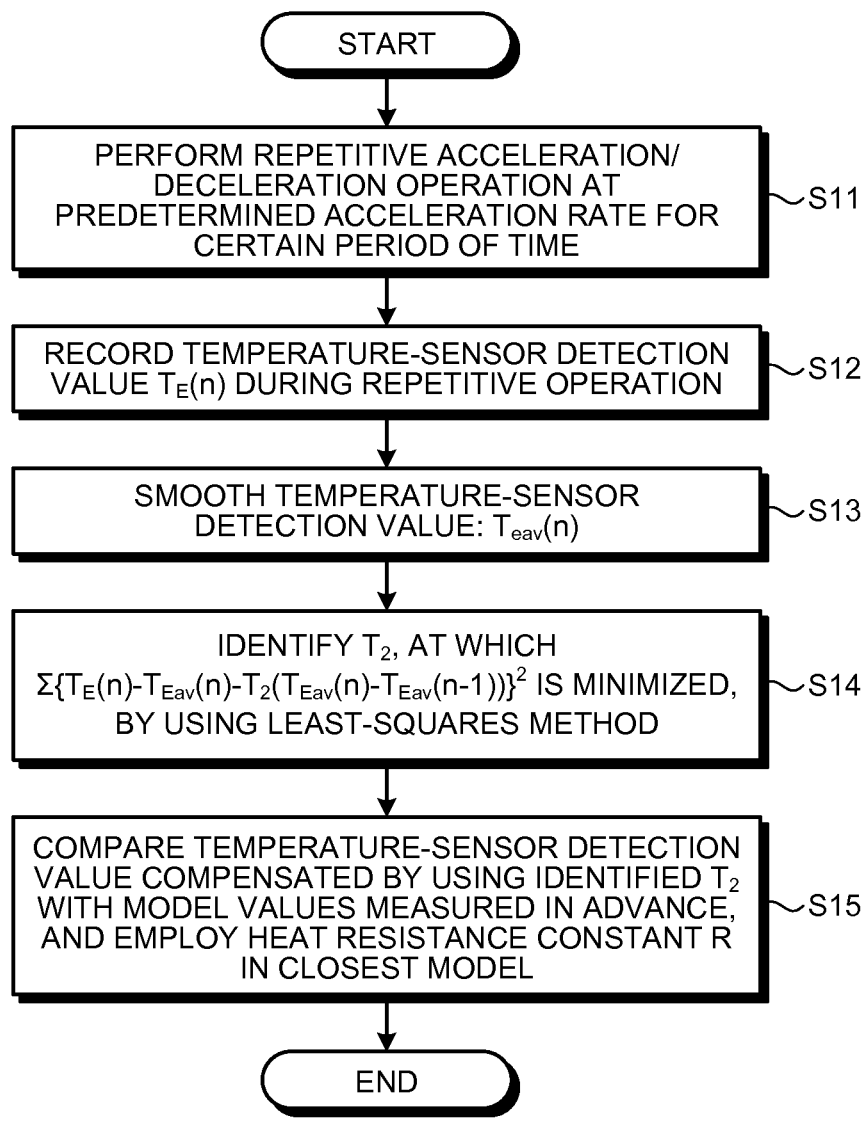

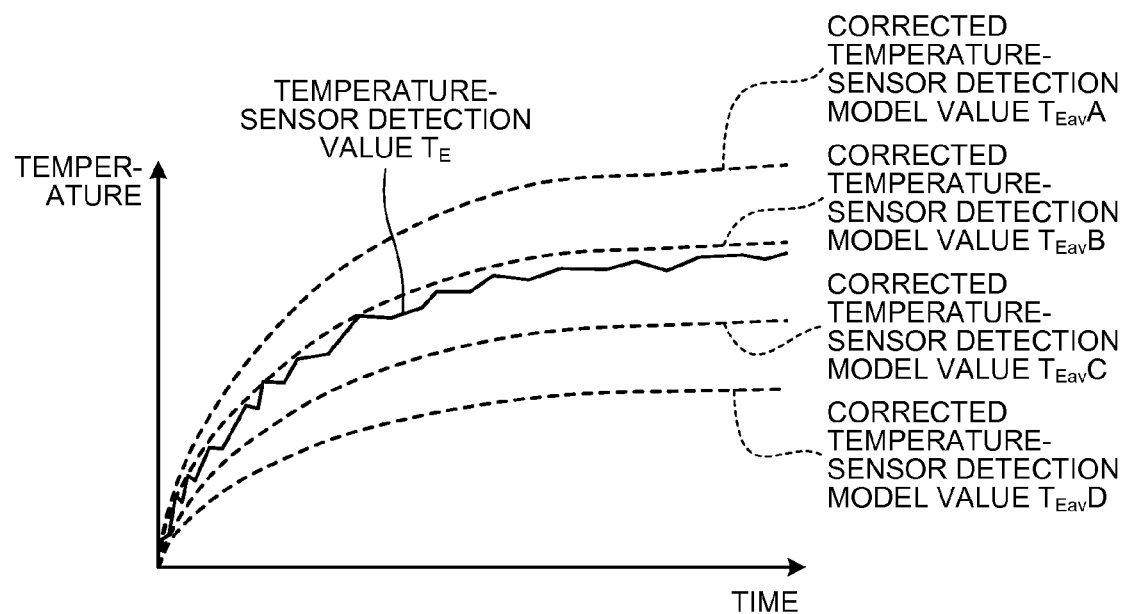

MOTOR DRIVE DEVICE

CROSS REFERENCE TO RELATED APPLICATIONS

This application is a National Stage of International Application No. PCT/JP2012/058623 filed Mar. 30, 2012, the contents of all of which are incorporated herein by reference in their entirety.

FIELD

The present invention relates to a drive device of a polyphase motor that includes a coil, and more particularly to a motor drive device having a function of estimating a motor coil temperature.

BACKGROUND

In a motor and a motor drive device, a drive torque is generated by flowing a current through a motor coil. When a large current continuously flows through the motor coil, the motor coil generates heat, which may reach a high temperature, such as equal to or higher than 180° C., and cause a fault, such as breakage of the motor coil or demagnetization of a motor magnet. Therefore, the motor coil needs to be protected by, for example, measuring its temperature to limit the current flowing through the motor coil. However, because it is physically difficult to provide a temperature sensor directly on the motor coil, it is necessary to estimate the temperature of the motor coil by some other possible methods.

In a conventional motor-coil temperature estimation method for a motor drive device, for example, as described in Patent Literature 1, the temperature detected by a temperature sensor provided in the periphery of a motor, and a low-pass filtered value of an integral of a value obtained by multiplying a square value of a motor current by a gain are added together to estimate the temperature of the motor coil.

CITATION LIST

Patent Literature

Patent Literature 1: Japanese Patent Application Laid-open No. 2005-204358

SUMMARY

Technical Problem

However, in the conventional motor-coil temperature estimation method mentioned above, a heat transfer lag from the motor coil to the temperature sensor provided in the periphery of the motor is not considered. Therefore, there is a problem in that during a period immediately after the motor is activated until the temperature in a motor peripheral portion, where the temperature sensor is provided, increases and reaches a steady state, a temperature estimation error that is the difference between a motor-coil temperature estimation value and an actual value becomes large, and accordingly the motor coil cannot be sufficiently protected.

Further, in the motor-coil temperature estimation method mentioned above, a fixed value is used as the gain by which the square value of the motor current is multiplied. However, the heat resistance of the motor varies depending on the structure of a device such as a flange to which the motor is attached. Therefore, there is a problem in that a motor-coil temperature estimation error may become large depending on the device.

The present invention has been achieved to solve the above problems, and an object of the present invention is to provide a motor drive device using a motor-coil temperature estimation method with a small error for enabling effective motor coil protection even in a state where the temperature of a motor peripheral portion, where a temperature sensor is provided, is low immediately after the motor is activated.

Further, an object of the present invention is to provide a motor drive device using a motor-coil temperature estimation method with a small error for enabling effective motor coil protection by simply identifying a constant to be used for estimating the motor coil temperature, even when a device to which the motor is attached changes.

Solution to Problem

In order to solve the above problems and achieve the object, the present invention relates to a motor drive device including: a motor drive unit that generates a current for driving a motor on a basis of a position command and a position detection value of the motor; a motor-coil ambient-temperature estimation unit that calculates a motor-coil ambient-temperature estimation value by correcting an output value of a temperature sensor provided in a peripheral portion of a motor coil of the motor by using a filter including both a phase-lead characteristic and a low-pass characteristic; a motor-coil increased-temperature estimation unit that calculates a motor-coil increased-temperature estimation value on a basis of the current; and a motor-coil protection unit that limits the current on a basis of the motor-coil ambient-temperature estimation value and the motor-coil increased-temperature estimation value.

Advantageous Effects of Invention

The motor drive device according to the present invention has an effect where a motor coil ambient temperature can be estimated more accurately by correcting a heat transfer lag even in a state where there is a large difference between an actual temperature of a motor coil and a temperature of a motor peripheral portion, where a temperature sensor is provided, at the time of activating the motor, for example. Further, the motor drive device according to the present invention has an effect where a motor coil temperature can be estimated more accurately by adding a motor-coil increased-temperature estimation value estimated from a motor current.

BRIEF DESCRIPTION OF DRAWINGS

FIG. 3-1 is a graph in which a current in a motor-coil temperature estimation unit according to the first embodiment is plotted in time series.

FIG. 3-2 is a graph in which an estimated amount of heat generation in the motor coil in the motor-coil temperature estimation unit according to the first embodiment is plotted in time series.

FIG. 3-3 is a graph in which a temperature-sensor detection value in the motor-coil temperature estimation unit according to the first embodiment is plotted in time series.

FIG. 3-4 is a graph in which a motor-coil temperature estimation value in the motor-coil temperature estimation unit according to the first embodiment is plotted in time series.

FIG. 4 is a block diagram illustrating the configuration of a motor-coil temperature estimation unit according to a second embodiment.

FIG. 6 is a flowchart of the identification method of the first-order lead compensation time constant $T_2$ to be used for motor-coil temperature estimation according to the third embodiment.

FIG. 7 is a flowchart of an identification method of a motor-coil increased-temperature estimation coefficient R (gain) and a first-order lead compensation time constant $T_2$ to be used for motor-coil temperature estimation according to a fourth embodiment.

FIG. 8 is a schematic graph for explaining an identification method of a coefficient to be used for motor-coil temperature estimation according to the fourth embodiment.

DESCRIPTION OF EMBODIMENTS

Exemplary embodiments of a motor drive device according to the present invention will be explained below in detail with reference to the drawings. The present invention is not limited to the embodiments.

First Embodiment

Figure 1:
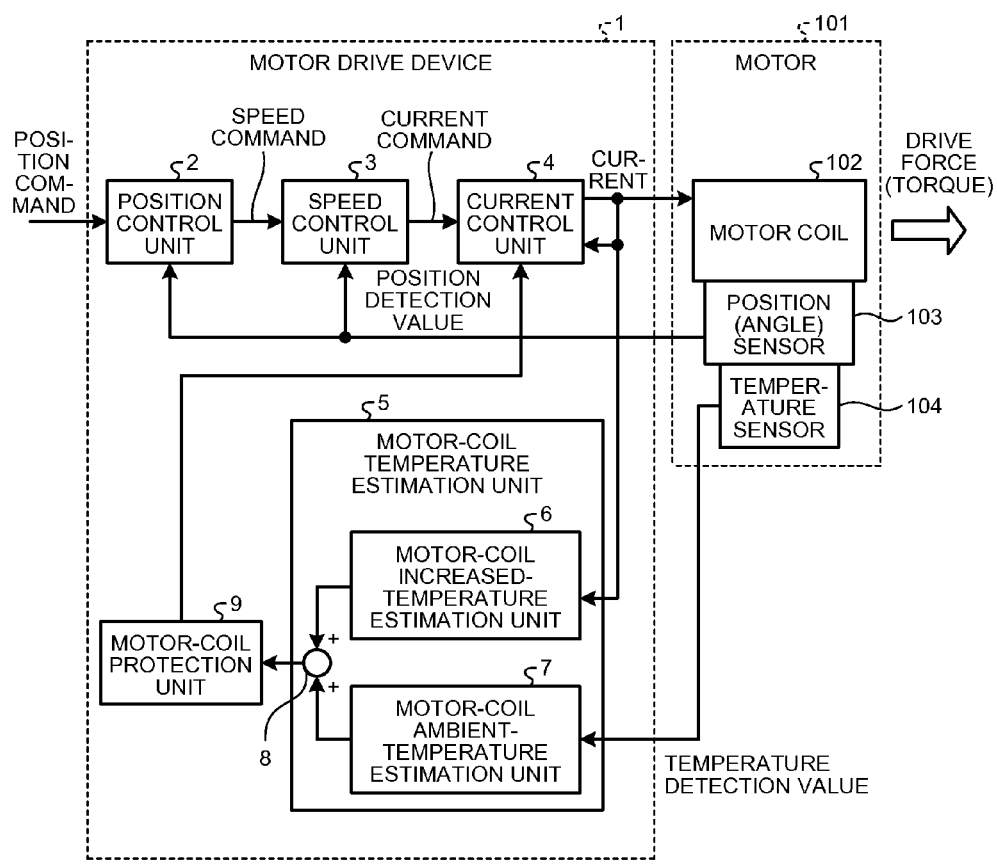
FIG. 1 is a block diagram illustrating the configuration of a motor and a motor drive device employing a motor-coil temperature estimation method according to a first embodiment.

A motor-coil temperature estimation method for a motor drive device 1 according to a first embodiment of the present invention is explained below. FIG. 1 is a block diagram illustrating the configuration of a motor 101 and the motor drive device 1 employing the motor-coil temperature estimation method according to the first embodiment of the present invention. The motor drive device 1 includes a position control unit 2, a speed control unit 3, a current control unit 4, a motor-coil temperature estimation unit 5, and a motor-coil protection unit 9. The motor 101 that is driven by the motor drive device 1 includes a motor coil 102, a position sensor 103, and a temperature sensor 104. The motor drive device 1 drives the motor 101 by controlling the current on the basis of a position command.

In the motor drive device 1, the position control unit 2 calculates a speed command on the basis of an input position command and a position detection value from the position sensor 103 provided in the motor 101. The speed control unit 3 then calculates a current command on the basis of the speed command and a speed detection value calculated on the basis of the position detection value. Next, the current control unit 4 controls the current on the basis of the current command and a current detection value detected by a current sensor (not shown), and drives the motor 101 by using this current.

Figure 2:
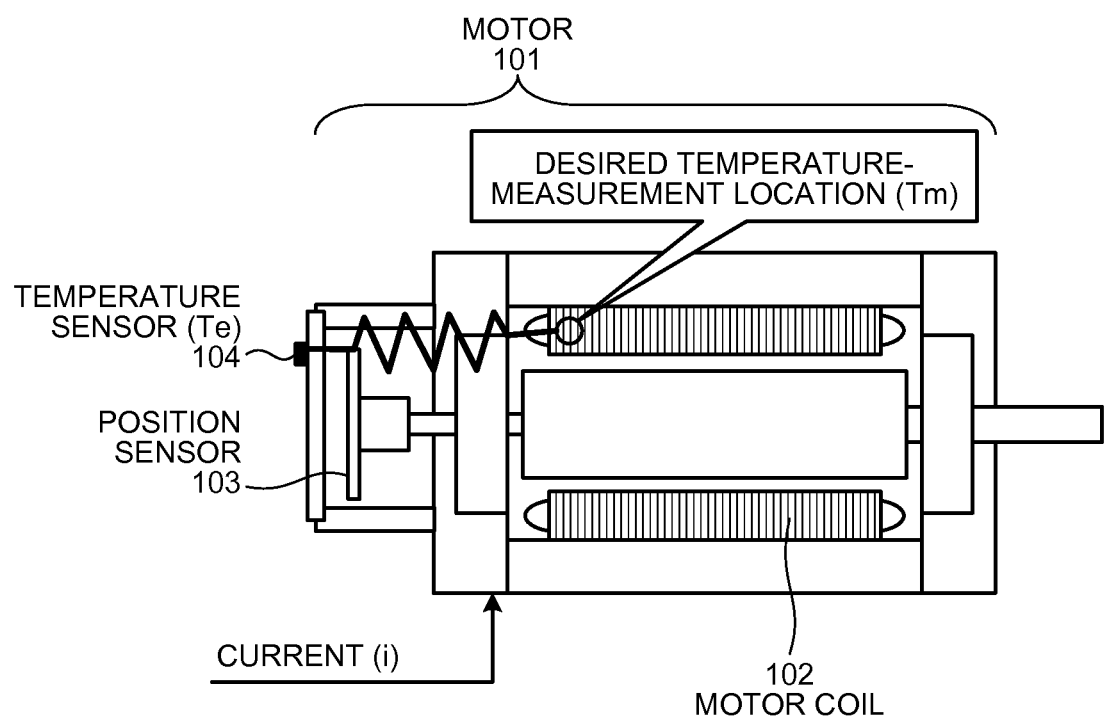
FIG. 2 is a schematic diagram explaining the arrangement of a motor coil and a temperature sensor inside the motor according to the first embodiment.

FIG. 2 is a schematic diagram explaining the arrangement of the motor coil 102 and the temperature sensor 104 in the motor 101. The temperature to be detected is the temperature of the motor coil 102. However, because it is difficult to provide the temperature sensor 104 near the motor coil 102 for structural reasons, typically, the temperature sensor 104 is often provided on a motor peripheral portion, such as the position sensor (an encoder) 103. Although the motor coil 102 generates heat due to the current controlled by the motor drive device 1, there is a heat transfer lag until the temperature of the motor coil 102 is transmitted to the temperature sensor 104.

An explanation will be given of motor-coil temperature estimation that is performed by the motor-coil temperature estimation unit 5 included in the motor drive device 1 and in which the heat transfer lag is taken into account.

An increased temperature $\Delta T$ of the motor coil 102 is a value obtained by dividing the integral of the difference between an amount of heat generation h per unit time and an amount of heat discharge c per unit time by a heat capacity C, as shown by the following equation (1).

$$\Delta T = \frac{1}{C} \int_{t_0}^{t} (h - c) dt \qquad (1)$$

In the case of the motor 101, the amount of heat generation h per unit time is proportional to the square of the current, and the amount of heat discharge c per unit time is proportional to the difference between the temperature near the motor coil 102 and the ambient temperature (outside air temperature). Further, the heat capacity C includes not only the heat capacity of the motor itself but also a heat capacity of a device-side structural member such as a flange to which the motor 101 is attached. Therefore, the value of the heat capacity C varies according to the device. Thus, it is very difficult to accurately identify the parameters for the temperature increase model of the motor coil 102 shown by the above equation (1), and a significant amount of computation is required for obtaining the temperature increase. Consequently, a motor-coil increased temperature $\Delta T$ is approximated by a first-order lag shown by the following equation (2).

$$\Delta T \approx \frac{R}{1 + T_1 s} i^2 \qquad (2)$$

In the equation, R represents a gain obtained by approximating the constants included in the heat capacity C and the amount of heat generation h as a single value, $T_1$ represents a time constant of a first-order lag filter, s represents a Laplace operator, and i represents a current that flows through the motor coil 102. With this equation, an increase in the motor coil temperature is estimated by feedforward, and the motor coil temperature can be estimated with a smaller response lag. In the above equation (2), the sum of the squares of the current is approximated by the first-order lag filter. However, as another computation method, by processing the square value of the current by using a moving average filter, the same effects can also be obtained.

Next, estimation of the motor-coil ambient temperature is explained. As shown in FIG. 2, there is a heat resistance between the motor coil 102 and the temperature sensor 104, and therefore there is a heat transfer lag. Accordingly, particularly at the time of activating the motor, the difference between the ambient temperature of the motor coil 102 and the temperature detected by the temperature sensor 104 becomes large. Thus, as shown by the following equation (3), a heat transfer lag is corrected by first-order lead compensation.

$$T_{Eav} = \frac{1 + T_2 s}{1 + 2 \cdot T_3 s + T_3 \cdot s^2} T_E \quad (3)$$

In the equation, $T_{Eav}$ represents a motor-coil ambient-temperature estimation value, $T_2$ represents a first-order lead compensation time constant, $T_3$ represents a second-order low-pass-filter time constant, s represents a Laplace operator, and $T_E$ represents a temperature-sensor detection value. In the above equation (3), a second-order low pass filter is used to perform a smoothing process for removing the influence of noise and the like. However, by using other low pass filters such as a moving average filter, the same effects can also be obtained. Further, by using a second or higher-order filter for phase-lead compensation in the numerator, the same effects can also be obtained.

In the motor-coil temperature estimation unit 5 included in the motor drive device 1, a motor-coil increased-temperature estimation value $\Delta T$ calculated by using the above equation (2) by a motor-coil increased-temperature estimation unit 6, and a motor-coil ambient-temperature estimation value $T_{Eav}$ calculated by using the above equation (3) by a motor-coil ambient-temperature estimation unit 7, are added together by an adder 8 as expressed by the following equation (4) to calculate and output a motor-coil temperature estimation value $T_M$. The calculated motor-coil temperature estimation value $T_M$ is transmitted to the motor-coil protection unit 9. Based on the motor-coil temperature estimation value $T_M$, the motor-coil protection unit 9 controls a current that flows through the motor coil 102 by, for example, limiting a current that flows from the current control unit 4.

$$T_M = T_{Eav} + \Delta T = \frac{1 + T_2 s}{1 + 2 \cdot T_3 s + T_3 \cdot s^2} T_E + \frac{R}{1 + T_1 s} i^2 \quad (4)$$

Figures 1, 3:
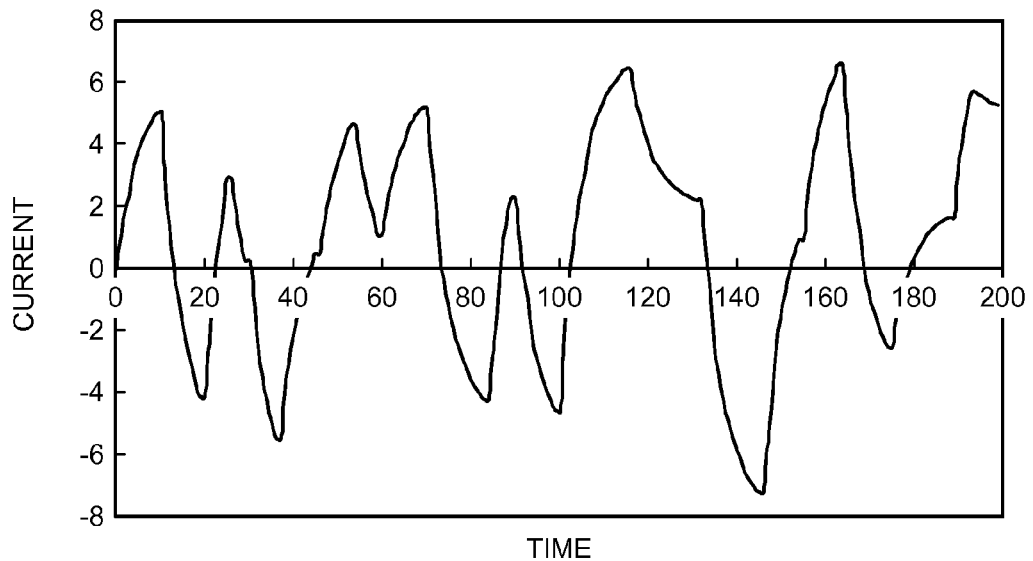
Figures 2, 3:
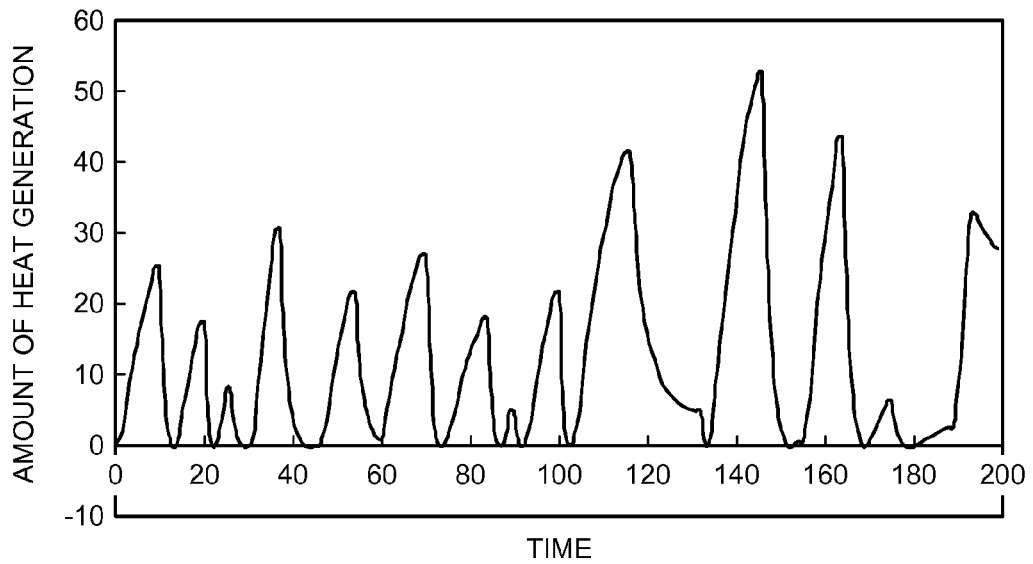
Figure 3:
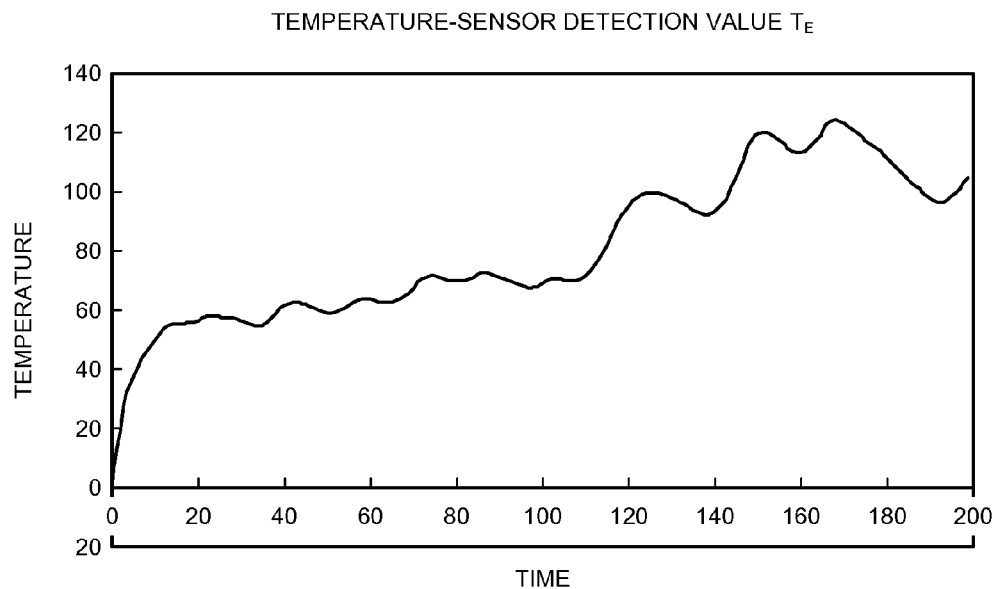

A current i, an estimated amount of heat generation in the motor coil $\Delta T$, the temperature-sensor detection value $T_E$, and the motor-coil temperature estimation value $T_M$, which are represented in the above equation (4), are explained below respectively with reference to FIGS. 3-1 to 3-4 that are schematic graphs in which these values are plotted in time series. FIG. 3-1 is a time-series graph of the current i that flows through the motor coil 102. FIG. 3-2 is a time-series graph of the product ($R \cdot P = R \cdot i^2$) obtained by multiplying the square of the current i by the gain. The product having been smoothed by the low pass filter represents the estimated amount of heat generation in the motor coil $\Delta T = R \cdot P_{av}$ in FIG. 3-4. FIG. 3-3 is a time-series graph of the temperature-sensor detection value $T_E$. The temperature-sensor detection value $T_E$ that has been smoothed represents $R_{eav}$ in FIG. 3-4. The first-order lead compensation amount represents $T_{of}$ in FIG. 3-4. The value of $T_{eav}$ that has been only smoothed is low at the time of activating the motor. However, by adding the first-order lead compensation amount $T_{of}$ to the value of $T_{eav}$, the heat transfer lag can be corrected. By adding the estimated amount of heat generation in the motor coil $\Delta T$ and the motor-coil ambient-temperature estimation value $T_{Eav}$ including the first-order lead compensation, it possible to estimate the motor coil temperature with high accuracy at all times including when the motor is activated.

As described above, according to the first embodiment of the present invention, the output value of the temperature sensor provided in the motor peripheral portion is corrected by using a filter including both first-order lead characteristics and low-pass characteristics, and is output as a motor ambient-temperature estimation value. Therefore, even in a state where there is a large difference between the actual temperature of the motor coil 102 and the temperature of the motor peripheral portion where the temperature sensor 104 is provided, at the time of activating the motor, for example, the heat transfer lag is corrected, and the motor coil ambient temperature can be estimated more accurately. Further, by adding the motor-coil increased-temperature estimation value estimated from the motor current, the motor coil temperature can be estimated more accurately. Furthermore, in a case where a second-order filter configured by combining the first-order lead filter and the second-order low pass filter is used as a filter to be used by the motor-coil ambient-temperature estimation unit 7, the motor coil temperature can be estimated with high accuracy with a reduced influence of noise, while the heat transfer lag from the motor coil 102 to the motor peripheral portion is corrected by a small amount of calculation.

Second Embodiment

Figures 3, 4:
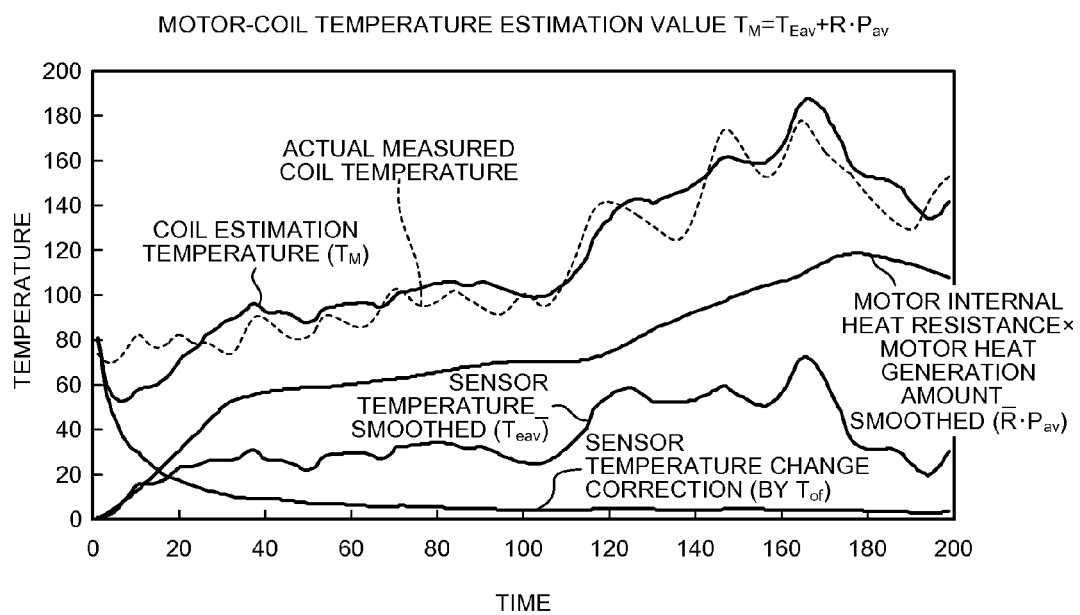
Figure 4:
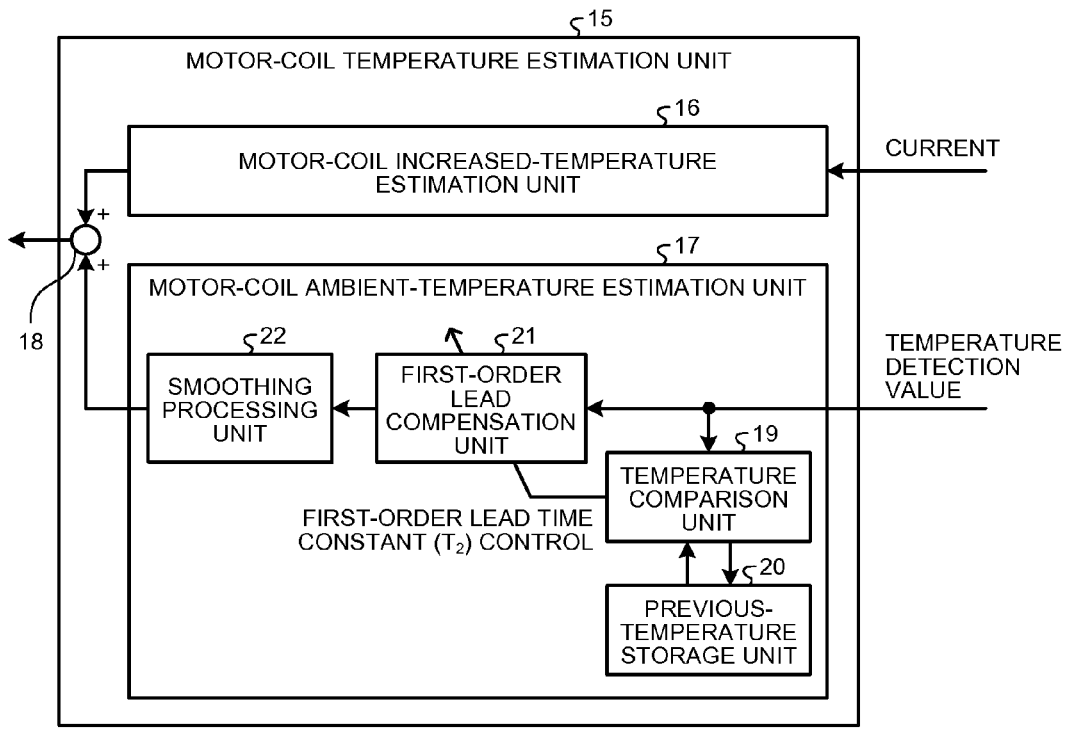

FIG. 4 is a block diagram of a motor-coil temperature estimation unit 15 of a motor drive device employing a motor-coil temperature estimation method according to a second embodiment of the present invention. In the present embodiment, the motor-coil temperature estimation unit 5 in FIG. 1 is replaced by the motor-coil temperature estimation unit 15 in FIG. 4. However, other parts are the same as those in the first embodiment, and therefore explanations thereof will be omitted.

The motor-coil temperature estimation unit 15 includes a motor-coil increased-temperature estimation unit 16, a motor-coil ambient-temperature estimation unit 17, and an adder 18. The motor-coil increased-temperature estimation unit 16 is the same as the motor-coil increased-temperature estimation unit 6 in the first embodiment. The motor-coil ambient-temperature estimation unit 17 includes a temperature comparison unit 19 that compares the present value (the latest value) and the previous value (a value immediately before the latest value) of a temperature-sensor detection value, a previous-temperature storage unit 20, a first-order lead compensation unit 21, and a smoothing processing unit 22.

In the motor-coil ambient-temperature estimation unit 17 according to the second embodiment, the previous value of the temperature-sensor detection value is stored in the previous-temperature storage unit 20, and the previous value and the present value of the temperature-sensor detection value are compared by the temperature comparison unit 19. When the difference between the previous value and the present value of the temperature-sensor detection value is equal to or larger than a predetermined value, a time constant $T_2$ in the first-order lead compensation unit 21 is validated. When the difference between the previous value and the present value of the temperature-sensor detection value is smaller than the predetermined value, the time constant $T_2$ in the first-order lead compensation unit 21 is made zero. The temperature-sensor detection value that has been processed by the first-order lead compensation unit 21 including the time when the time constant $T_2$ is invalid is smoothed as the motor-coil ambient-temperature estimation value $T_{Eav}$ by the smoothing processing unit 22. Thereafter, the motor-coil ambient-temperature estimation value $T_{Eav}$ and the motor-coil increased-temperature estimation value $\Delta T$ estimated by the motor-coil increased-temperature estimation unit 16 are added together by the adder 18 to be output as the motor-coil estimation temperature $T_M$.

As described above, according to the second embodiment of the present invention, the motor-coil ambient-temperature estimation unit 17 uses a filter that has the phase-lead characteristics when the temperature increase value calculated on the basis of the previous value and the present value of the temperature sensor 104 is equal to or larger than a predetermined value, and that does not have the phase-lead characteristics when the temperature increase value is smaller than the predetermined value. Therefore, in a state where there is a large temperature difference between the motor coil 102 and the motor peripheral portion where the temperature sensor 104 is provided, at the time of activating the motor, for example, the heat transfer lag from the motor coil 102 to the motor peripheral portion is corrected. In a steady state where there is a small temperature difference between the motor coil 102 and the motor peripheral portion, such a correction is not performed and the influence of noise and the like is eliminated. This makes it possible to estimate the motor coil temperature more accurately.

Third Embodiment

Figure 5:
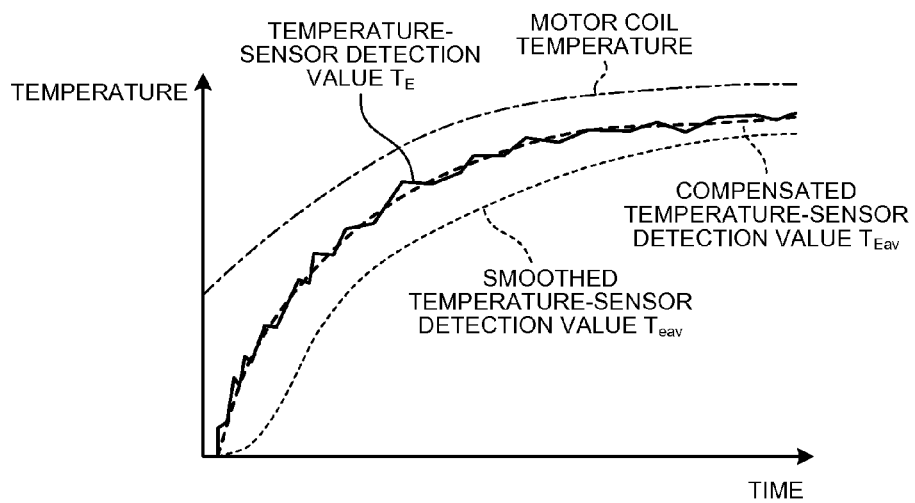
FIG. 5 is a schematic graph for explaining an identification method of a first-order lead compensation time constant $T_2$ to be used for motor-coil temperature estimation according to a third embodiment.

FIG. 5 is a schematic graph for explaining a parameter identification method to be used for estimating a motor coil temperature according to a third embodiment of the present invention. The temperature-sensor detection value $T_E$ has a response lag and includes noise. The smoothed temperature-sensor detection value $T_{eav}$, obtained by smoothing the temperature-sensor detection value $T_E$, has a larger response lag. Therefore, the response lag is improved by the first-order lead compensation in the motor-coil ambient-temperature estimation unit 7 according to the first embodiment. However, when the first-order lead compensation time constant $T_2$ is not appropriately set, this leads to insufficient compensation or excessive compensation, thereby causing a larger estimation error of the motor-coil ambient temperature.

FIG. 6 is a flowchart of an identification method of the first-order lead compensation time constant $T_2$. The identification method of the first-order lead compensation time constant $T_2$ is explained below according to this flowchart. First, a repetitive acceleration/deceleration operation at a predetermined acceleration rate is continuously performed for a certain period of time (Step S1). A time-series pattern of the temperature-sensor detection value $T_E$ during the operation is recorded (Step S2). Next, the recorded time-series pattern of the temperature-sensor detection value $T_E$ is smoothed (multiplied by low-pass characteristics) (Step S3). Lastly, by using a least-squares method, the first-order lead compensation time constant $T_2$ is identified, at which the sum of the squares of the difference between the time-series pattern of the temperature-sensor detection value $T_E$ and the time-series pattern of the motor-coil ambient-temperature estimation value $T_{Eav}$, obtained by including the first-order lead compensation in the smoothed data described above, is minimized (Step S4). Because the motor-coil temperature estimation method is the same as that in the first embodiment or the second embodiment, explanations thereof will be omitted.

As described above, according to the third embodiment of the present invention, the motor drive device 1 has a function of identifying a coefficient to be used for the first-order lead compensation by the motor-coil ambient-temperature estimation unit 7 on the basis of the temperature-sensor detection value of the temperature sensor 104 provided in the motor peripheral portion when driving the motor 101 with a predetermined speed pattern. Therefore, even when the motor 101 is mounted on various devices with different characteristics, it is still possible to estimate the motor coil temperature with high accuracy by using the coefficient that is identified according to the characteristics.

Fourth Embodiment

FIG. 7 is a flowchart of an identification method of a constant to be used by a motor-coil temperature estimation unit. The constant identification method is explained below according to this flowchart. First, a repetitive acceleration/deceleration operation at an acceleration rate determined such that an average current value becomes a predetermined value is continuously performed for a certain period of time (Step S11). A time-series pattern of each of the current i and the temperature-sensor detection value $T_E$ during the operation is recorded (Step S12). Next, the recorded time-series pattern of the temperature-sensor detection value $T_E$ is smoothed (multiplied by the low-pass characteristics) (Step S13). By using a least-squares method, the first-order lead compensation time constant $T_2$ is identified, at which the sum of the squares of the difference between the time-series pattern of the temperature-sensor detection value $T_E$ and the time-series pattern of the motor-coil ambient-temperature estimation value $T_{Eav}$, obtained by including the first-order lead compensation in the smoothed data described above, is minimized (Step S14). Next, the motor-coil ambient-temperature estimation value that has undergone the first-order lead compensation by using the identified time constant $T_2$ is compared with a plurality of motor-coil ambient-temperature models measured in advance with different flanges to which the motor is attached. A coefficient R (gain) of the above equation (2) identified in advanced to be used for estimating the motor-coil increased temperature in the closest model is employed (Step S15). Because the motor-coil temperature estimation method is the same as that in the first or the second embodiment, explanations thereof will be omitted.

FIG. 8 is a graph of the temperature-sensor detection value $T_E$ and a plurality of model values of the temperature-sensor detection value measured in advance with different flanges to which the motor is attached, when the motor is continuously driven by substantially the same average current. Even with the same current, there are different temperature increase curves because the heat capacities including the flange heat capacities are difference from each other. Therefore, a model that is close to a temperature-sensor detection value in the actual device is considered to have a heat capacity close to that of the actual device. At the same time as measuring model curves in advance, an actual motor coil temperature is measured by using a thermocouple or the like, and the coefficient R to be used by the motor-coil increased-temperature estimation unit 6 is identified. By employing the coefficient R of a model having a heat capacity close to that of the actual device, it is possible to estimate a motor-coil increased temperature in the actual device with higher accuracy.

As described above, according to the fourth embodiment of the present invention, the motor drive device 1 has a function of identifying a coefficient by which the square value of the motor current is multiplied in the motor-coil increased-temperature estimation unit 6 on the basis of the motor current and the detection value of a temperature sensor provided in the motor peripheral portion, when driving the motor 101 with a predetermined speed pattern. Therefore, even when the motor is mounted on various devices with different heat resistances, the motor coil temperature can still be estimated with high accuracy by using the coefficient that is identified according to the heat resistance.

The invention of the present application is not limited to the above embodiments and can be variously modified at the execution stage without departing from the scope thereof. Moreover, the above-described embodiments include inventions in various stages and various inventions can be extracted by appropriately combining a plurality of disclosed components. For example, even if several components are omitted from all the components illustrated in the embodiments, a configuration in which the several components are omitted can be extracted as an invention as long as the problem described in the section of Technical Problem can be solved and the effects described in the section of Advantageous Effects of Invention can be obtained. Furthermore, the components in the different embodiments may be appropriately combined.

INDUSTRIAL APPLICABILITY

As described above, the motor drive device according to the present invention is useful for a motor drive device having a function of estimating a motor coil temperature, and is particularly suitable for a motor drive device having a function of protecting a motor coil from overheating on the basis of a motor-coil temperature estimation value.

REFERENCE SIGNS LIST 1 motor drive device
2 position control unit
3 speed control unit
4 current control unit
5, 15 motor-coil temperature estimation unit
6, 16 motor-coil increased-temperature estimation unit
7, 17 motor-coil ambient-temperature estimation unit
8, 18 adder
9 motor-coil protection unit
19 temperature comparison unit
20 previous-temperature storage unit
21 first-order lead compensation unit
22 smoothing processing unit
101 motor
102 motor coil
103 position sensor
104 temperature sensor
S1 to S4, S11 to S15 step

The invention claimed is:

1. A motor drive device comprising:
a motor drive unit that generates a current for driving a motor on a basis of a position command and a position detection value of the motor;
a motor-coil ambient-temperature estimation unit that calculates a motor-coil ambient-temperature estimation value by correcting an output value of a temperature sensor provided in a peripheral portion of a motor coil of the motor by using a filter including both a phase-lead characteristic and a low-pass characteristic;
a motor-coil increased-temperature estimation unit that calculates a motor-coil increased-temperature estimation value on a basis of the current; and
a motor-coil protection unit that limits the current on a basis of the motor-coil ambient-temperature estimation value and the motor-coil increased-temperature estimation value, wherein
the motor-coil ambient-temperature estimation unit causes the filter to have the phase-lead characteristic when a temperature increase value calculated on a basis of an output value of the temperature sensor and its immediately previous output value is larger than a predetermined value, and causes the filter not to have the phase-lead characteristic when the temperature increase value is smaller than the predetermined value.

2. The motor drive device according to claim 1, wherein the motor-coil ambient-temperature estimation unit determines a coefficient to be used for the phase-lead characteristic on a basis of a time-series pattern of an output value of the temperature sensor and a time-series pattern that is obtained by multiplying the time-series pattern of the output value by the low-pass characteristic when driving the motor with a predetermined acceleration/deceleration pattern.

3. The motor drive device according to claim 2, wherein the motor-coil increased-temperature estimation unit calculates the motor-coil increased-temperature estimation value by correcting a value that is obtained by multiplying a square value of the current by a predetermined gain by using a low pass filter, and determines the gain on a basis of the motor-coil ambient-temperature estimation value obtained by using the determined coefficient and on a basis of time-series patterns of the output value of the temperature sensor and the current when driving the motor with the predetermined acceleration/deceleration pattern.

4. The motor drive device according to claim 1, wherein the motor-coil increased-temperature estimation unit calculates the motor-coil increased-temperature estimation value by correcting a value that is obtained by multiplying a square value of the current by a predetermined gain by using a low pass filter, and determines the gain on a basis of time-series patterns of the output value of the temperature sensor and the current when driving the motor with a predetermined acceleration/deceleration pattern.

* * * * *